US012666230B2

(12) United States Patent
Paterour et al.

(10) Patent No.: US 12,666,230 B2
(45) Date of Patent: Jun. 23, 2026

(54) METHOD FOR DISCRIMINATING REQUESTS IN A REGROUP OF GROUPS IN A 3GPP MCS NETWORK

(71) Applicant: AIRBUS DS SLC, Elancourt (FR)

(72) Inventors: Olivier Paterour, Elancourt (FR);
François Piroard, Elancourt (FR)

(73) Assignee: AIRBUS DS SLC, Elancourt (FR)

( * ) Notice: Subject to any disclaimer, the term of this patent is extended or adjusted under 35 U.S.C. 154(b) by 255 days.

(21) Appl. No.: 18/339,514

(22) Filed: Jun. 22, 2023

(65) Prior Publication Data

US 2023/0422000 A1     Dec. 28, 2023

(30) Foreign Application Priority Data

Jun. 22, 2022   (FR) ...................................... 2206125

(51) Int. Cl.
*H04W 4/08* (2009.01)
(52) U.S. Cl.
CPC .................................... *H04W 4/08* (2013.01)
(58) Field of Classification Search
CPC .. H04W 76/10; H04W 76/45; H04L 65/4038; H04L 65/4061
See application file for complete search history.

(56) References Cited

U.S. PATENT DOCUMENTS

| 9,300,739 | B2 * | 3/2016 | Deprun ................... H04L 67/10 |
| 12,342,412 | B2 * | 6/2025 | Madishetty ......... H04L 65/1104 |
| 2015/0009865 | A1 * | 1/2015 | Sharma ................. H04W 76/45 |
| | | | 370/277 |
| 2020/0120454 | A1 * | 4/2020 | Gundur ............... H04L 65/1016 |
| 2021/0329420 | A1 * | 10/2021 | Chee ....................... H04W 4/10 |
| 2022/0346184 | A1 * | 10/2022 | Ramamoorthy ...... H04W 76/10 |
| 2025/0126680 | A1 * | 4/2025 | Kapale .................. H04W 76/10 |

OTHER PUBLICATIONS

Search Report as issued in French Patent Application No. FR2206125, dated Feb. 10, 2023.

(Continued)

*Primary Examiner* — Lester G Kincaid
(74) *Attorney, Agent, or Firm* — CUSHMAN PARTNERS LLC

(57) ABSTRACT

A method for discriminating, by a first destination client entity, requests in a communication network according to the 3GPP MCS "3rd Generation Partnership Program Mission-Critical System" standard, wherein the requests received by the destination client entity include a first mission-critical service request originating from the non-controlling server of the second communication group and a second mission-critical service request originating from the non-controlling server of the third communication group, each request received including at least one piece of belonging group information of the non-controlling server emitting the request.

9 Claims, 4 Drawing Sheets

PRIOR ART

(56) References Cited

OTHER PUBLICATIONS

"3rd Generation Partnership Project; Technical Specification Group Core Network and Terminals; Mission Critical Push To Talk (MCPTT) call control; Protocol specification (Release 17)," 3GPP Standard; Technical Specification; 3GPP TS 24.379, 3rd Generation Partnership Project (3GPP), vol. CT WGI, No. V17.6.0, Mar. 2022, Retrieved from the Internet: URL:https://ftp.3gpp.org/Specs/archive/24_series/24.379/24379-h60.zip 24379-h60.docx [retrieved on Mar. 26, 2022], XP052144866, pp. 1-684.

Airbus: "Discussion paper on procedures for initiating a group regroup call with interconnect" , 3GPP Draft; CI-220153, 3rd Generation Partnership Project (3GPP), vol. CT WGI, No. E-meeting; Jan. 17, 2022-Jan. 21, 2022, Jan. 2022, Retrieved from the Internet: URL:https://ftp.3gpp.org/tsg_ct/WG1_mm-ccsm_ex-CN1/TSGC1_133e-bis/Docs/CI-220153.zip CI-220153—Discussion paper on procedures for initiating a group regroup call with interconnect. docx [retrieved on Jan. 10, 2022], 4 pages.

* cited by examiner

Figure 2:
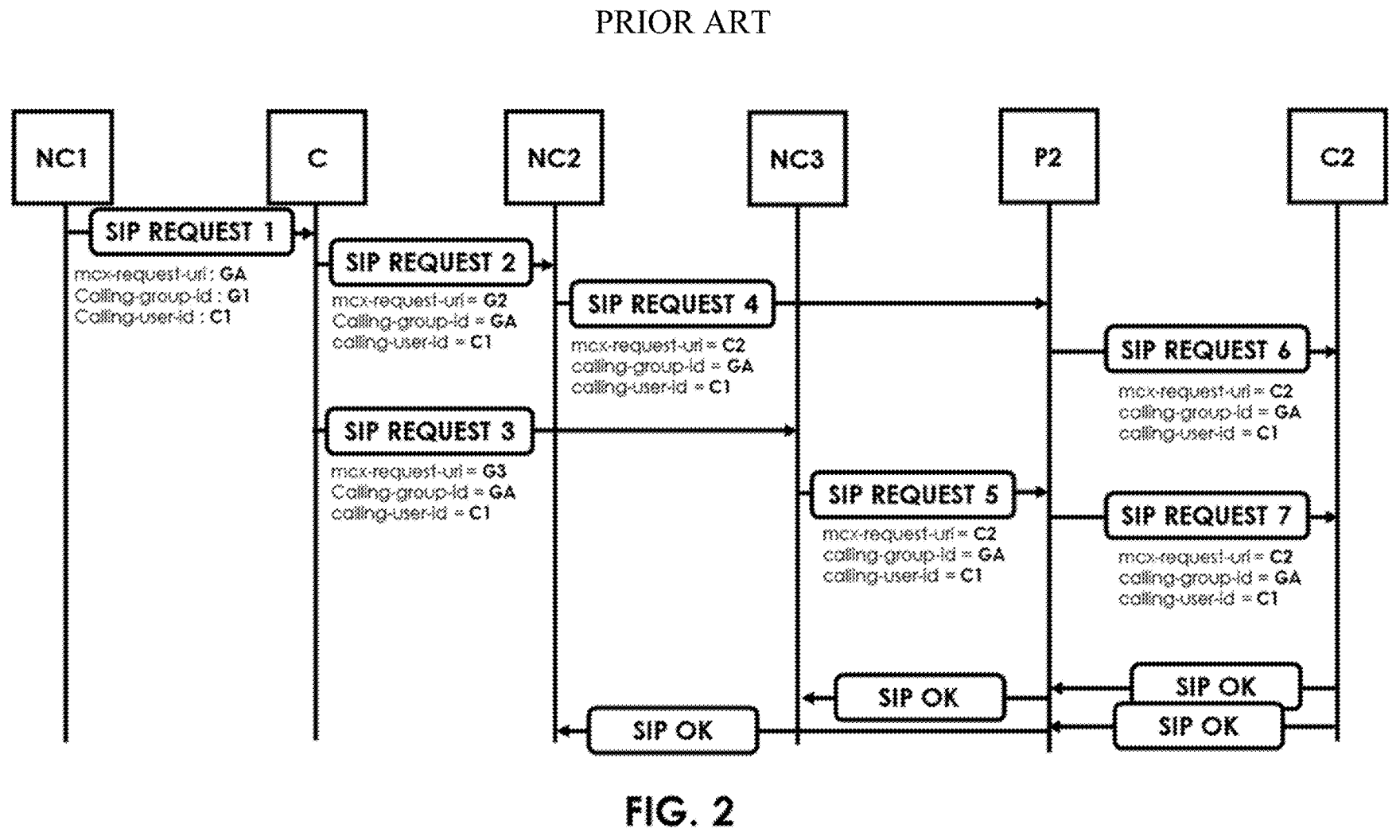

PRIOR ART

NC1

SIP REQUEST 1
mcx-request-uri: GA
Calling-group-id : G1
Calling-user-id : C1

C

SIP REQUEST 2
mcx-request-uri = G2
Calling-group-id = GA
calling-user-id = C1

SIP REQUEST 3
mcx-request-uri = G3
Calling-group-id = GA
calling-user-id = C1

NC2

SIP REQUEST 4
mcx-request-uri = C2
calling-group-id = GA
calling-user-id = C1

SIP OK

NC3

SIP REQUEST 5
mcx-request-uri = C2
calling-group-id = GA
calling-user-id = C1

SIP OK

P2

SIP REQUEST 6
mcx-request-uri = C2
calling-group-id = GA
calling-user-id = C1

SIP REQUEST 7
mcx-request-uri = C2
calling-group-id = GA
calling-user-id = C1

SIP OK

SIP OK

METHOD FOR DISCRIMINATING REQUESTS IN A REGROUP OF GROUPS IN A 3GPP MCS NETWORK

CROSS-REFERENCE TO RELATED APPLICATIONS

This application claims priority to French Patent Application No. 2206125, filed Jun. 22, 2022, the entire content of which is incorporated herein by reference in its entirety.

FIELD

The technical field of the invention is that of telecommunications.

The present invention relates to a method for discriminating between requests in a regroup of groups in a network according to the 3GPP MCS standard, and in particular between a plurality of requests to a same user device belonging to several groups included in a same regroup of groups.

BACKGROUND

The PMR (Professional Mobile Radio) radiocommunication standards TETRAPOL®, TETRA® or even P25® enable the implementation of secure professional networks. These narrowband networks are national or local area networks: they are implemented, for example, within an organisation such as a company, or within a country, for example, for communications between firefighters, law enforcement agencies, the military, etc.

These networks are evolving towards support for broadband exchanges. The 3GPP standard governing "GSM" (Global System for Mobile Telecommunications) type mobile networks, in particular in their third, fourth and fifth generations respectively called "3G", "4G" and "5G", and subsequent generations, and more particularly in deployments resorting to critical communications services defined by the 3GPP called "MCS" or "Mission Critical Services" allows these secure broadband exchanges. A 3G, 4G or 5G network implements 3G/4G/5G terminal equipment (UE), a 3G/4G/5G Radio Access Network (RAN) and a network core (3G/4G/5G). Deployments of broadband MCS services are of course not limited to 3G/4G/5G mobile networks but also include deployments in fixed and mobile IP (Internet Protocol) networks, for example WLANs (Wide Local Area Networks).

By "communication network according to the 3GPP MCS standard", it is meant a communication network compatible with the 3GPP MCS standard and more particularly with the current version of 3GPP, which is version 17, with the previous versions from version 13 and with the subsequent versions integrating all the characteristics of the invention.

Such a network is, for example, represented in FIG. 1. This network comprises a number of clients C1 and C2, each connected to a "participating" (according to 3GPP MCS) server P1 and P2 respectively. Participating servers P1 and P2 can communicate with other servers in the network. In FIG. 1, the participating servers P1 and P2 each communicate with at least one Non-Controlling server. Participating Server P1 communicates with Non-Controlling Server NC1 and Participating Server P2 with Non-Controlling Server NC2 and Non-Controlling Server NC3. Each non-controlling server NC1 to NC3 communicates with a same controlling (according to the 3GPP MCS) server C. The participating P1 and P2, controlling C and non-controlling NC1 to NC3 servers are of the "MCX servers" type as defined in the 3GPP MCS.

The network represented in FIG. 1 comprises several communication groups G1 to G3, groups G1 and G2 comprising a client C1 and C2 respectively, and a participating server P1 and P2 respectively. Each communication group G1 to G3 comprises a non-controlling server NC1 to NC3 respectively. The client C2 belongs to both the communication group G2 and the communication group G3. Communication groups G1 to G3 are regrouped into a regroup of communication groups GA. Participating servers P1 and P2 are servers which manage clients of the communication group to which they belong. Participating servers P1 and P2 manage clients C1 and C2 respectively. The Controlling server C is in charge of managing the regroup of communication groups GA. The Non-Controlling servers NC1 to NC3 can be seen as sub-servers of the regroup of communication groups and are in charge of managing one or more of the "constituent" groups G1 to G3 of the regroup GA of communication groups.

When the "participating", "controlling" and "non-controlling" functions are implemented by independent servers, they are referred to as "participating server", "controlling server" and "non-controlling server". When they are all implemented by a same server or distributed over several servers, they are referred to as "participating function", "controlling function" and "non-controlling function". The terms "function" and "server" may then be used interchangeably in the remainder of the description, and depend only on the implementation chosen. The term "server" will mainly be used, although this does not prevent the same physical device from implementing one or more of the "participating", "controlling" and/or "non-controlling" functions.

In the 3GPP MCS standard, the following communication services are defined:

MCPTT (Mission-critical Push To Talk), which enables voice communications,

MCVideo, which enables video communications,

MCData, which comprises three sub-services:

SDS, which stands for "Short Data Service", and

FD, which stands for "File Distribution",

IPCon, which stands for "IP Connectivity".

Hereinafter, "MCX server" refers to a network server configured to implement any 3GPP MCS communication service, that is MCPTT, MCData or MCVideo.

Each client C1 and C2 is a user device, also referred to as user equipment (UE) or client entity, and is for example a smartphone, a tablet, a laptop or any other device, for example a 4G/5G key, enabling communication within a network. A user device comprises at least one non-transitory memory or machine readable medium and at least one processor, the memory comprising instructions which, when executed by the processor, cause the user equipment to implement actions assigned thereto in the remainder of the description. In some implementations, the user devices comprise a display module. Likewise, the different servers MCX C, P1, P2 and NC1 to NC3, are devices comprising at least one non-transitory memory or machine readable medium and at least one processor, the memory comprising instructions which, when executed by the processor, cause the server to implement actions assigned thereto in the remainder of the description. The servers and user devices are interconnected and form at least one network such as that represented in FIG. 1, this network implementing wired, wireless communications or any combination thereof.

The client C2 belongs to the communication group G2 and to the communication group G3. It is thus managed, within group G2 and group G3, by the participating server P2. Thus, when a communication is intended for the group G2, the participating server P2 informs the client C2 of the communication, and when a communication is intended for the G3 group, the participating server P2 informs the client C2 of the communication. A problem arises when a client belonging to a group in the regroup of groups GA attempts to communicate within the regroup of groups GA. Such a problem is represented in FIG. 2.

The problem arises when a request from a client in the regroup of groups has the same regroup of groups as a destination. In the example of FIG. 1, client C1 emits a request to the regroup of groups, for example a communication request. For this, according to the 3GPP MCS standard, this request is first transmitted to the participating server which manages the client C1 within its communication group G1, that is the participating server P1, and then to its non-controlling server NC1. The non-controlling server NC1 then forwards the request to the controlling server C, which is responsible for transmitting it to each other communication group belonging to the communication regroup of groups GA, that is to groups G2 and G3.

In the 3GPP MCS standard, such a request is of the "SIP" type, SIP being a Session Initiation Protocol. A SIP request, also written "SIP REQUEST", can be a "SIP INVITE" type invite, defined by RFC 3261, or a "SIP MESSAGE" type message.

The SIP REQUEST 1 is a request for an invite to establish a session in the regroup of groups GA. Within the scope of the 3GPP MCS standard, this message includes a <mcx-request-uri> field indicating the destination group of the communication, that is the global group of regroup GA in the example of FIG. 2.

The SIP REQUEST 1 also includes a <calling-group-id> field indicating to which communication group included in the global group GA the client C1 belongs. The group G1 of the client C1 included in the global group GA is so-called "constituent", because it is part of the three groups "constituting" the global group GA.

Finally, the request comprises a <calling-user-id> field comprising the identifier of the client C1 at the origin of the request.

When this request reaches the controlling server C of the global group GA, the controlling server C dispatches this request to the non-controlling servers of each other group constituting the global group GA, that is to NC2 and NC3, as represented in FIG. 2. The request is therefore duplicated for each group, so controlling server C sends a SIP REQUEST 2 request to non-controlling server NC2 and a SIP REQUEST 3 request to non-controlling server NC3. Each request indicates, in the <mcx-request-uri> field, the communication destination group, that is group G2 for SIP REQUEST 2 and group G3 for SIP REQUEST 3 and in the <calling-group-id> field, the communication group to which the controlling server C belongs, that is group GA.

The non-controlling server NC2 receives the SIP REQUEST 2 request and the non-controlling server NC3 receives the SIP REQUEST 3 request. Each non-controlling server will then transmit this request to the participating servers in their respective groups. Participating server P2 will therefore receive SIP REQUEST 4 and 5 respectively from non-controlling server NC2 and non-controlling server NC3. It will then transmit the request to the clients it manages, including client C2 which belongs to groups G2 and G3. In this way, the participating server P2 will transmit a SIP REQUEST 6 and 7 respectively to the client C2, SIP REQUEST 6 and SIP REQUEST 7 being identical. The client C2 then has no way of knowing which of the non-controlling server NC2 or the non-controlling server NC3 each of the SIP REQUEST 6 and SIP REQUEST 7 requests comes from. The client C2 may, however, have different roles in the different groups G2 and G3 of which it is a member, for example a "dispatcher" or team leader role, implying different priorities, which may or may not allow it to pre-empt the right to speak to other users in the group having a lower priority, or use different functional aliases in the different groups, which may give additional identification information to the other users participating in the regroup.

The client C2 receiving each request, even if it can know from the structure of the regroup that it will receive several similar requests, cannot choose under which of the constituent groups it will process the request, and therefore possibly choose its role, its priority or its functional alias in the regroup.

Furthermore, in the protocol, the client C2 is obliged to respond to each request received. There is therefore a risk that the client C2 will accept each of the different requests, which may lead to the establishment of multiple identical media, for example voice or video, sessions which may have an impact on the global performance of the network.

There is therefore a need to solve the problems previously set forth.

SUMMARY

One or more aspects of the invention offer a solution to the problems previously discussed, by enabling a client entity receiving a multitude of identical requests to discriminate between the requests received.

An aspect of the invention relates to a method for discriminating, by a first destination client entity, requests in a communication network according to the 3GPP MCS "3rd Generation Partnership Program Mission-Critical System" standard, the communication network comprising at least:

a global communication group regrouping a plurality of communication groups, at least one emitting client entity affiliated with a first communication group of the plurality of communication groups, the destination client entity, affiliated with at least a second and a third communication group of the plurality of communication groups, a controlling server in charge of managing the global communication group, at least one participating server managing each client entity, for each communication group of the plurality of communication groups:

at least one non-controlling server of the global communication group in charge of managing the communication group, the method comprising at least the steps of:

transmitting, by the emitting entity, via the participating server managing the emitting entity and the non-controlling server of the first group, to the controlling server, a mission-critical service request within the global group, determining, by the controlling server, the communication groups included in the global communication group, transmitting the mission-critical service request, by the controlling server, to the non-controlling server of each communication group determined to be included in the global communication group, determining, by each non-controlling server, the destination client entities of the mission-critical service request, transmitting the mission-critical service request, by each non-controlling server, to each destination client entity determined, via the participating server managing the destination client entity determined, receiving at least a first mission-critical service request from the non-controlling server of the second communication group and a second mission-critical service request from the non-controlling server of the third communication group, by the first destination client entity, each request received comprising at least one piece of belonging group information for the non-controlling server emitting the request, accepting, by the first destination client entity, one request from among the first and second requests as a function of the belonging group information of the non-controlling server emitting the request.

By virtue of an aspect of the invention, a destination client entity of identical requests from several communication groups to which it belongs can discriminate between these requests and accept only one of them, thereby resolving the problems of prior art. Thus, it is possible for a client entity to choose the role it will have in a communication by knowing the communication group under which it receives each request and choosing the request that is appropriate for it, and thus the communication group from which it will accept the service request in the global communication group.

Further to the characteristics just discussed in the preceding paragraph, the method according to one or more aspects of the invention may have one or more additional characteristics from among the following, considered individually or according to any technically possible combinations:

the method comprises a step of adding, to the request, the belonging group information of the non-controlling server emitting the request, the step of adding the belonging group information of the non-controlling server emitting the request to the request is implemented by the non-controlling server before the step of transmitting the request by the non-controlling server, the method comprises a step of rejecting the request which has not been accepted from among the first and second requests as a function of the belonging group information of the non-controlling server emitting the request, rejecting comprises sending a rejection request, from the first destination client entity to the non-controlling server emitting the mission-critical service request rejected, accepting the request is made on the basis of a configuration of the destination client entity.

Another aspect of the invention relates to a communication network according to the 3GPP MCS "3rd Generation Partnership Program Mission-Critical System" standard, the communication network comprising at least:

a global communication group regrouping a plurality of communication groups, at least one emitting client entity affiliated with a first communication group of the plurality of communication groups, at least one destination client entity, affiliated with at least a second and a third communication group of the plurality of communication groups, a controlling server in charge of managing the global communication group, at least one participating server managing each client entity affiliated with the communication group, for each communication group of the plurality of communication groups:

at least one non-controlling server of the global communication group in charge of managing the communication group, the communication network being configured to implement the method according to the invention.

In an embodiment, the network is a third generation "3G", fourth generation "4G" or fifth generation "5G" network, in which the first user device is a user equipment "UE", the first network comprising at least one network core and at least one radio access network "RAN".

Another aspect of the invention relates to a computer program product comprising machine executable instructions that cause the network according to an aspect of the invention to execute the steps of the method according to an aspect of the invention.

Another aspect of the invention relates to a non-transitory computer-readable medium on which the computer program according to an aspect of the invention is recorded.

Various aspects of the invention and its different applications will be better understood upon reading the following description and upon examining the accompanying figures.

BRIEF DESCRIPTION OF THE FIGURES

The figures are set forth by way of indicating and in no way limiting purposes of the invention.

FIG. 2 shows a schematic representation of a state-of-the-art method for requesting mission-critical services in a global communications group.

DETAILED DESCRIPTION

The figures are set forth by way of indicating and in no way limiting purposes of the invention.

Unless otherwise specified, a same element appearing in different figures has a single reference.

Figure 3:
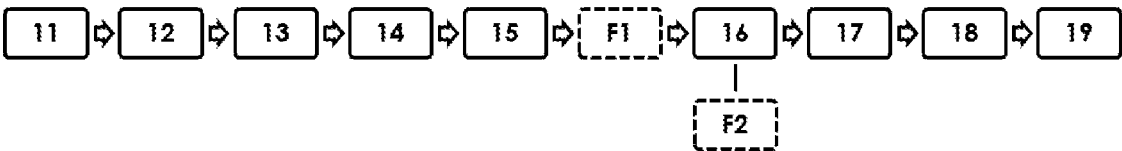
FIG. 3 shows a schematic representation of a method according to an aspect of the invention.

FIG. 3 shows a schematic representation of a request discrimination method according to an aspect of the invention.

Figure 1:
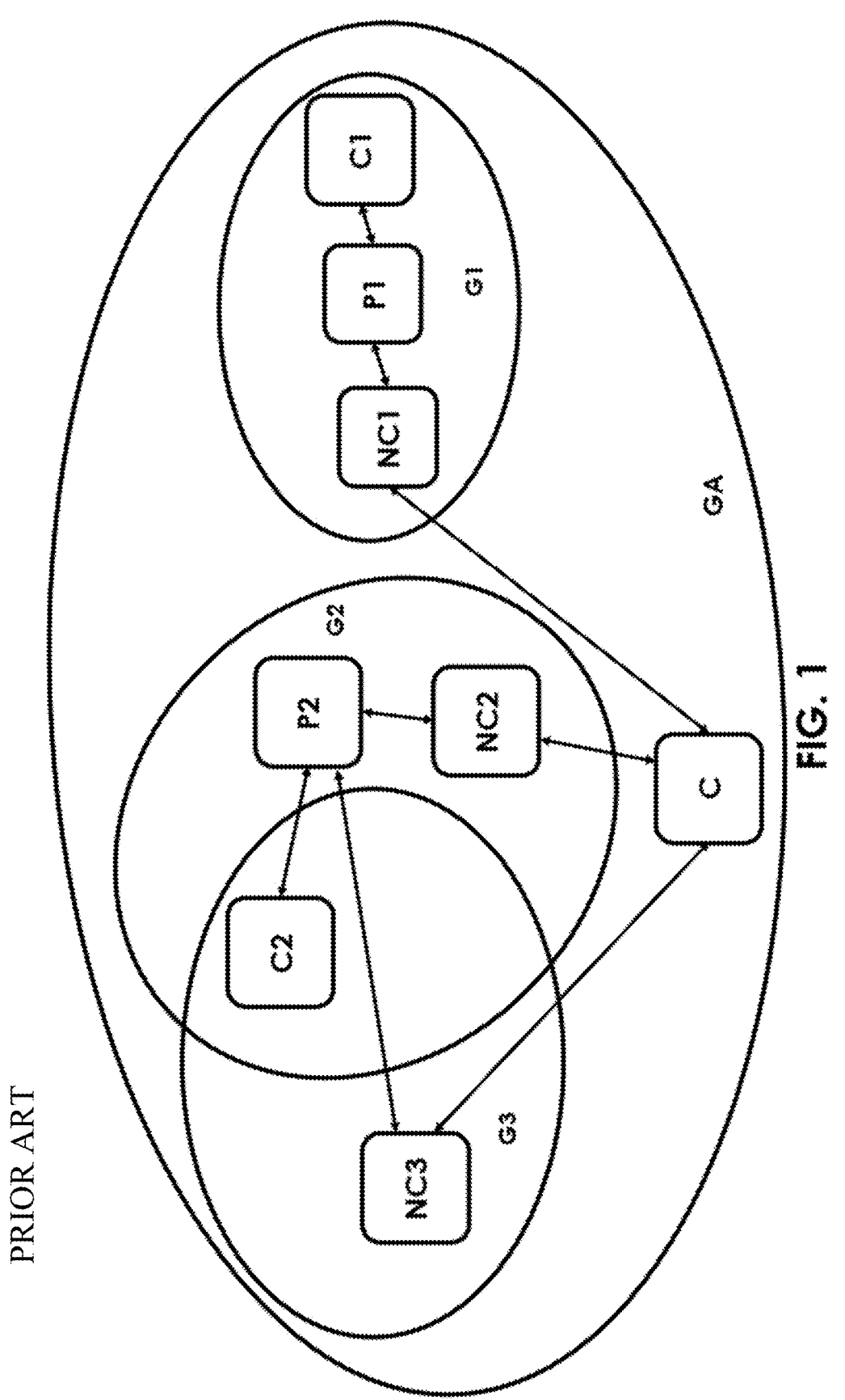
FIG. 1 shows a schematic representation of a communication network of the state of the art in which the problem arises.

The method 1 according to an aspect of the invention is implemented by a communication network according to the 3GPP MCS standard. To illustrate the implementation of the method according to an aspect of the invention, the communication network according to the 3GPP MCS standard of FIG. 1, already set forth in the state of the art of the present application, will be used. Thus, the method 1 according to an aspect of the invention can be implemented by the network of FIG. 1. In such a case, the client entity emitting a mission-critical service request is the client entity, or client, C1. The destination client entity is client entity, or client C2. As explained previously, each client C1 and C2 is a user device, also referred to as user equipment (UE) or client entity, and is for example a smartphone, a tablet, a laptop or any other device, for example a 4G/5G key, enabling communication within a network. A user device comprises at least one non-transitory memory or machine readable medium and at least one processor, the memory comprising instructions which, when executed by the processor, cause the user equipment to implement actions assigned thereto in the remainder of the description. In some implementations, the user devices comprise a display module.

In the method 1 according to an aspect of the invention, discrimination is possible by the destination client entity C2 by virtue of information added to each request to the destination client entity C2.

The method 1 according to the invention comprises a first step 11 of transmitting, by the emitting client entity C1, via the participating server P1 of the first group G1 and via the non-controlling server NC1, to the controlling server C, a mission-critical service request within the global group GA. Such a request is identical to the SIP REQUEST 1 of the state of the art. As explained previously, the different servers MCX C, P1, P2 and NC1 to NC3, are devices comprising at least one non-transitory memory or machine readable medium and at least one processor, the memory comprising instructions which, when executed by the processor, cause the server to implement actions assigned thereto in the remainder of the description. The servers and user devices are interconnected and form at least one network such as that represented in FIG. 1, this network implementing wired, wireless communications or any combination thereof.

In a step 12 of the method 1 according to an aspect of the invention, the controlling server C determines the groups constituting the global group GA, that is the groups G1 to G3. For this, the controlling server C has knowledge of the groups constituting the global group GA, for example because it stores a group regroup configuration file.

The controlling server C then transmits, in a step 13, each SIP REQUEST 2 and SIP REQUEST 3 respectively to the communication groups G2 and G3. By "transmitting to a communication group", it is meant transmitting the communication group included in the global group to the non-controlling server.

Each non-controlling server belonging to a group determined in step 12 then receives a request from the controlling server C. Thus, the non-controlling server NC2 receives a SIP REQUEST 2 request and the non-controlling server NC3 receives a SIP REQUEST 3 request.

In a step 14, each non-controlling server determines the destination client entities of the mission-critical service request. As a non-controlling server has the mission of managing the group, the non-controlling server has knowledge of the client entities of the group, for example because it stores a file listing the client entities, as well as their roles within the group, and can therefore know whether these client entities are destination entities of the mission-critical service request.

The constituent group information added to the request is added to the request by each non-controlling server at a step 15. In fact, the latter has knowledge of the constituent group it manages, through the <mcx-request-uri> field received from C, and will transmit the request in a step 16. In step 15, the non-controlling server adds the information of the constituent group to which it belongs to the request. Thus, to the SIP REQUEST 4 request, the non-controlling server NC2 adds the constituent group G2 information, which belongs to the group G2, such as in an "associated-group-id" header field. In the same way, to the SIP REQUEST 5 is added the constituent group G3 information, by the non-controlling server NC3, which belongs to the group G3.

Figure 4:
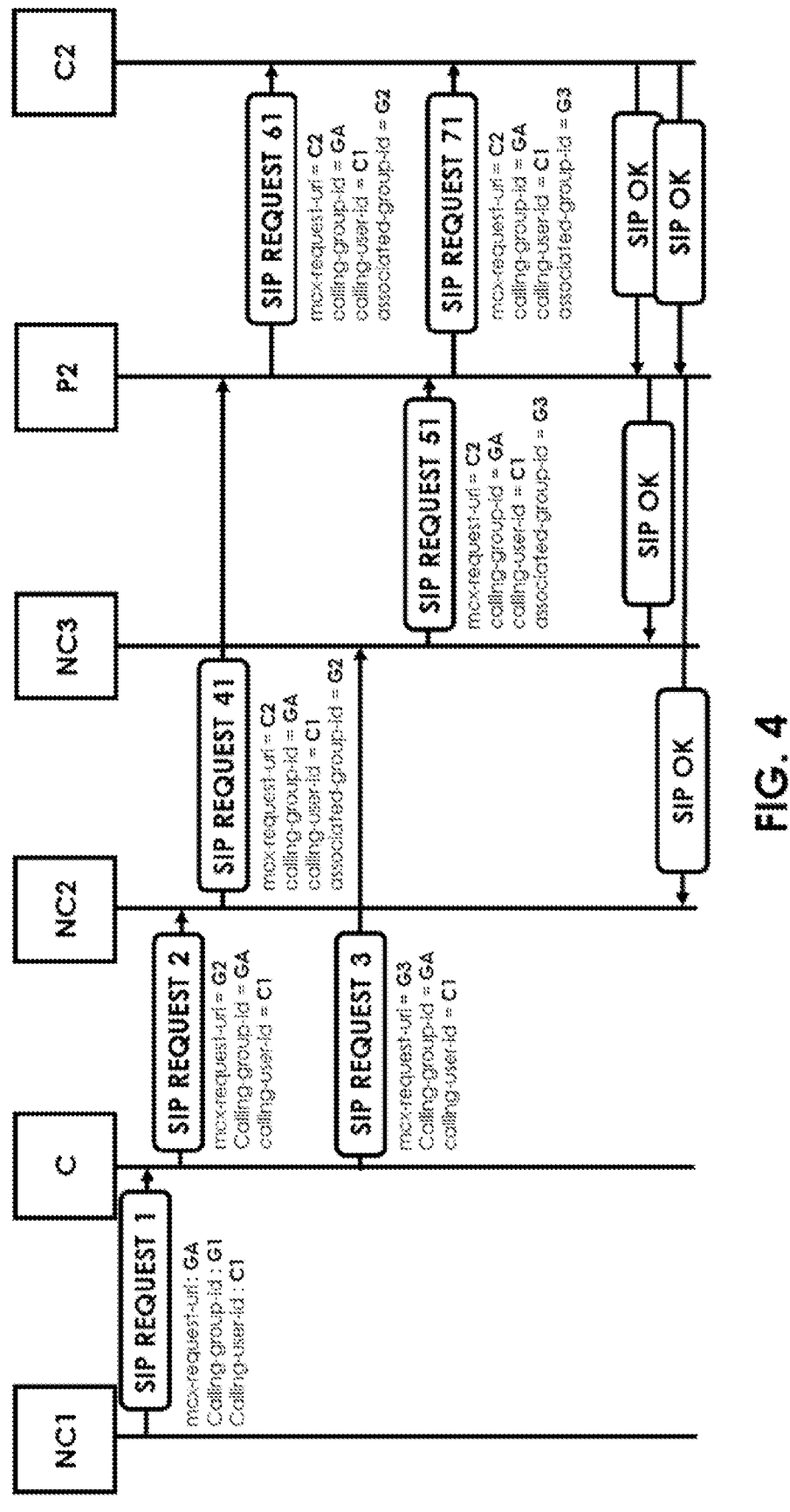
FIG. 4 shows a schematic representation of a modified method according to an aspect of the invention for requesting a mission-critical service in a global communication group.

The method is also represented in the form of data exchange in FIG. 4. The SIP REQUEST requests 41, 51, 61 and 71 in FIG. 4 all include the belonging group information of the request-emitting non-controlling server in the <associated-group-id> header field. The request-emitting non-controlling server is the non-controlling server that will transmit the request received from the controlling server C to the participating server managing the destination client C2, in step 16. The group to which the non-controlling server belongs is the group it manages. For example, for the non-controlling server NC2, the belonging group information of the non-controlling server emitting the request is information indicating the group G2.

In an optional alternative in which at least one non-controlling server manages several communication groups, the non-controlling server managing several communication groups performs a request filtering step F1. Indeed, a non-controlling server managing several communication groups will receive several identical requests for the communication groups it manages. To carry out this filtering F1, the non-controlling server includes or retrieves a configuration file or configuration data, indicating at least one filtering rule. This filtering rule may, for example, depend on the parameters of the different communication groups managed by the non-controlling server, and/or depend on the user profile of the destination entity C2, in order, for example, to make the filtering depend on a future role of the destination entity C2 within the service announced by the requests. For example, filtering can be used to select a request corresponding to a communication group in which the destination client entity has a more important role than in another communication group among the communication groups managed by the non-controlling server. Thus, the non-controlling server managing several communication groups will only transmit one request for one communication group among the communication groups it manages.

In a step 16, the request is transmitted by each non-controlling server NC2 and NC3 to the participating servers managing the client entities determined in step 14. At this transmission step 16, each request already includes the constituent group information under which the destination client entity receives the request, that is the constituent group information to which the non-controlling server emitting the request at step 16 belongs. Each participating server receiving the request transmits it to each client entity it manages. In one optional alternative compatible with the previous filtering alternative, the participating server receiving the request performs filtering F2 of the requests it receives to keep only one. To perform this filtering F2, the participating server includes or retrieves a configuration file or configuration data, indicating at least one filtering rule. This filtering rule may indicate that only the first request for a same service should be transferred to the destination client entity C2. Alternatively, the filtering rule may depend on the communication group belonging information added and be implemented on all the requests received for a same service, for example within a predefined time interval. This filtering rule can then, for example, depend on the parameters of the different communication groups, and/or depend on the user profile of the destination entity C2, in order, for example, to make the filtering depend on a future role of the destination entity C2 within the service announced by the requests. For example, filtering can make it possible to select a request corresponding to a communication group in which the destination client entity has a more important role than in another communication group from among the communication groups included in the requests received for a same service. In this way, the participating server P2 will only transmit one request for one communication group among the requests received for a same service. The participating server can then reject the filtered requests by sending rejection information to the non-controlling server that sent it the request, the rejection being based on the same reason that the destination client entity C2 would use, so as not to risk cancelling the communication. In this alternative in which the participating server performs filtering F2, the destination client entity C2 does not perform any filtering.

The constituent group information added to the request is copied by the participating server P2 into the request which it then transmits to the destination client entity C2. In this way, the constituent group G2 information is added to the SIP REQUEST 61 request by the participating server P2, such as in an "associated-group-id" header field. In the same way, to the SIP REQUEST 71 is added the constituent group G3 information, by the participating server P2, for example in an "associated-group-id" header field.

Each destination client entity determined in step 14 thus receives at least one mission-critical service request in a step 17. At least one destination client entity, for example the destination client entity C2, receives two mission-critical service requests, for example a first mission-critical service request SIP REQUEST 61 from the participating server P2 originating from the non-controlling server NC2 of the second communication group G2 and a second mission-critical service request SIP REQUEST 71 from the participating server P2 originating from the non-controlling server NC3 of the third communication group G3. Each received request SIP REQUEST 61 and SIP REQUEST 71 includes the belonging group information of the non-controlling server emitting the request, that is the group G2 to which the non-controlling server NC2 belongs for SIP REQUEST 6 and the group G3 to which the non-controlling server NC3 belongs for SIP REQUEST 7.

When the client entity C2 receives a first request, the destination client entity C2 may be configured to start a time interval for waiting for other identical requests comprising the belonging constituent group information of the non-controlling server emitting the request. Such a time interval is, for example, 10 seconds. If the destination client entity C2 receives another request in this time interval, the destination client entity C2 will, at the end of the time interval, have to choose between the identical requests, with the exception of the constituent group information, received in the time interval which request it accepts and which requests it rejects. Alternatively, after receiving the first request, the destination client entity C2 can determine, from a configuration file of the regroup of groups GA that it stores and the belonging group information of the non-controlling server emitting the request, which other requests it will receive because it knows the groups to which it belongs and the groups included in the regroup of groups GA. The destination client entity C2 can then make its choice of request even before it has received all the requests, and reject or accept the first request and then each subsidiary request as soon as they are received. In the alternative in which the participating server P2 performs filtering F2, the destination client entity C2 does not perform the filtering described herein.

An aspect of the invention then comprises at least one step 18 of accepting, by the destination client entity C2, a request from among the requests received as a function of the belonging group information of the non-controlling server emitting the request. For this, the destination client C2 entity is configured to make a choice automatically, for example as a function of a configuration of the client entity, or to make a choice manually, for example by proposing to a user, via an alert displayed on a screen of the destination client C2 entity, the requests received so that the user can choose which request to accept. The choice can be made automatically as a function of at least one role of the destination client entity C2 in each group identified by the belonging group information of the non-controlling server emitting the request for each request received, or for example as a function of a preferred group among these groups identified. In the alternative in which the participating server P2 performs filtering F2, the destination client entity C2 then does not perform the request selection described herein.

The method 1 includes an optional step 19 of rejecting requests not accepted in step 18, in order to inform the non-controlling server via the participating server that transmitted the rejected request to the destination client entity C2 that the request is rejected. The request rejection information includes a rejection reason, for example "request accepted under another constituent group". This reason prevents the non-controlling server from forwarding information to the controlling server C that the destination client entity C2 has rejected the request and the controlling server C from cancelling the call when the mission-critical service is a call. In a call with mandatory participation, if one of the participants rejects the request, the call may have to be cancelled. By informing the non-controlling server of the rejection for a new reason, that is by informing it that the request has been rejected but that another request has been accepted for the same service, the service will not be cancelled, as the non-controlling server may consider that the users participation in the transaction is still guaranteed. In the alternative in which the participating server P2 performs filtering F2, the destination client entity C2 then does not perform the request rejection described herein.

Thus, the method according to an aspect of the invention makes it possible to prevent a client entity from accepting several identical requests and therefore from creating several identical parallel communications. When the service is an MCData service, an aspect of the invention can be used to send only an acknowledgement following receipt by the destination client entity of a plurality of identical "delivery" or "read" messages.

It will be appreciated that the various embodiments and aspects of the inventions described previously are combinable according to any technically permissible combinations.

The articles "a" and "an" may be employed in connection with various elements, components, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The invention claimed is:
1. A method for discriminating, by a first destination client entity, requests in a communication network according to the 3GPP MCS "3rd Generation Partnership Program Mission-Critical System" standard, the communication network including
    a global communication group regrouping a plurality of
       communication groups, at least one emitting client entity affiliated with a first communication group of the plurality of communication groups, a destination client entity, affiliated with at least a second and a third communication group of the plurality of communication groups, a controlling server in charge of managing the global communication group, at least one participating server managing each client entity, for each communication group of the plurality of communication groups, at least one non-controlling server of the global communication group in charge of managing the communication group, the method comprising:

transmitting, by the emitting entity, via the participating server managing the emitting entity and the non-controlling server of the first group, to the controlling server, a mission-critical service request within the global group, determining, by the controlling server, the communication groups included in the global communication group, transmitting the mission-critical service request, by the controlling server, to the non-controlling server of each communication group determined to be included in the global communication group, determining, by each non-controlling server, the destination client entities of the mission-critical service request, transmitting the mission-critical service request, by each non-controlling server, to each destination client entity determined, via the participating server managing the destination client entity determined, receiving at least a first mission-critical service request from the non-controlling server of the second communication group and a second mission-critical service request from the non-controlling server of the third communication group, by the first destination client entity, the non-controlling server of the second communication group and the non-controlling server of the third communication group being different servers each managing a different constituent communication group included in the global communication group, each request received comprising at least one piece of belonging group information of the non-controlling server emitting the request, wherein the first mission-critical service request comprises belonging group information identifying the second communication group and the second mission-critical service request comprises belonging group information identifying the third communication group, and accepting, by the first destination client entity, one request from among the first and second mission-critical service requests as a function of the belonging group information of the non-controlling server emitting the request.

2. The method according to claim 1, further comprising adding, to the request, the belonging group information of the non-controlling server emitting the request.

3. The method according to claim 2, wherein said adding to the request the belonging group information of the non-controlling server emitting the request is implemented by the non-controlling server before the step of transmitting the request by the non-controlling server.

4. The method according to claim 1, further comprising rejecting the request not accepted from among the first and second mission-critical service requests as a function of the belonging group information of the non-controlling server emitting the request.

5. The method according to claim 4, wherein said rejecting comprises sending a rejection request, from the first destination client entity to the non-controlling server emitting the mission-critical service request rejected.

6. The method according to claim 1, wherein accepting the request is made on the basis of a configuration of the destination client entity.

7. A communication network according to the 3GPP MCS "3rd Generation Partnership Program Mission-Critical System" standard, the communication network comprising:

a global communication group regrouping a plurality of communication groups, at least one emitting client entity affiliated with a first communication group of the plurality of communication groups, at least one destination client entity, affiliated with at least a second and with a third communication group of the plurality of communication groups, a controlling server in charge of managing the global communication group, at least one participating server adapted to manage each client entity affiliated with the communication group, for each communication group of the plurality of communication groups, at least one non-controlling server of the global communication group in charge of managing the communication group, the communication network being configured to implement the method according to claim 1.

8. The communication network according to claim 7, wherein the communication network is a third-generation "3G", fourth-generation "4G" or fifth-generation "5G" network, wherein the first user device is a user equipment "UE", the first network comprising at least one network core and at least one radio access network "RAN".

9. A non-transitory computer readable medium comprising machine executable instructions that cause the communication network to execute the steps of the method according to claim 1.

* * * * *